T. S. ETHERIDGE.
BOOK COVERING MACHINE.
APPLICATION FILED MAR. 31, 1917.

1,297,131. Patented Mar. 11, 1919.
16 SHEETS—SHEET 1.

Inventor
Theodore S. Etheridge
By Moulton & Liverance
Attorneys.

T. S. ETHERIDGE.
BOOK COVERING MACHINE.
APPLICATION FILED MAR. 31, 1917.

1,297,131.

Patented Mar. 11, 1919.
16 SHEETS—SHEET 4.

Inventor
Theodore S. Etheridge
By Moulton & Lawrence
Attorneys.

T. S. ETHERIDGE.
BOOK COVERING MACHINE.
APPLICATION FILED MAR. 31, 1917.

1,297,131.

Patented Mar. 11, 1919.
16 SHEETS—SHEET 5.

Inventor
Theodore S. Etheridge
By Moulton & Livinance
Attorneys

T. S. ETHERIDGE.
BOOK COVERING MACHINE.
APPLICATION FILED MAR. 31, 1917.
1,297,131.
Patented Mar. 11, 1919.
16 SHEETS—SHEET 7.
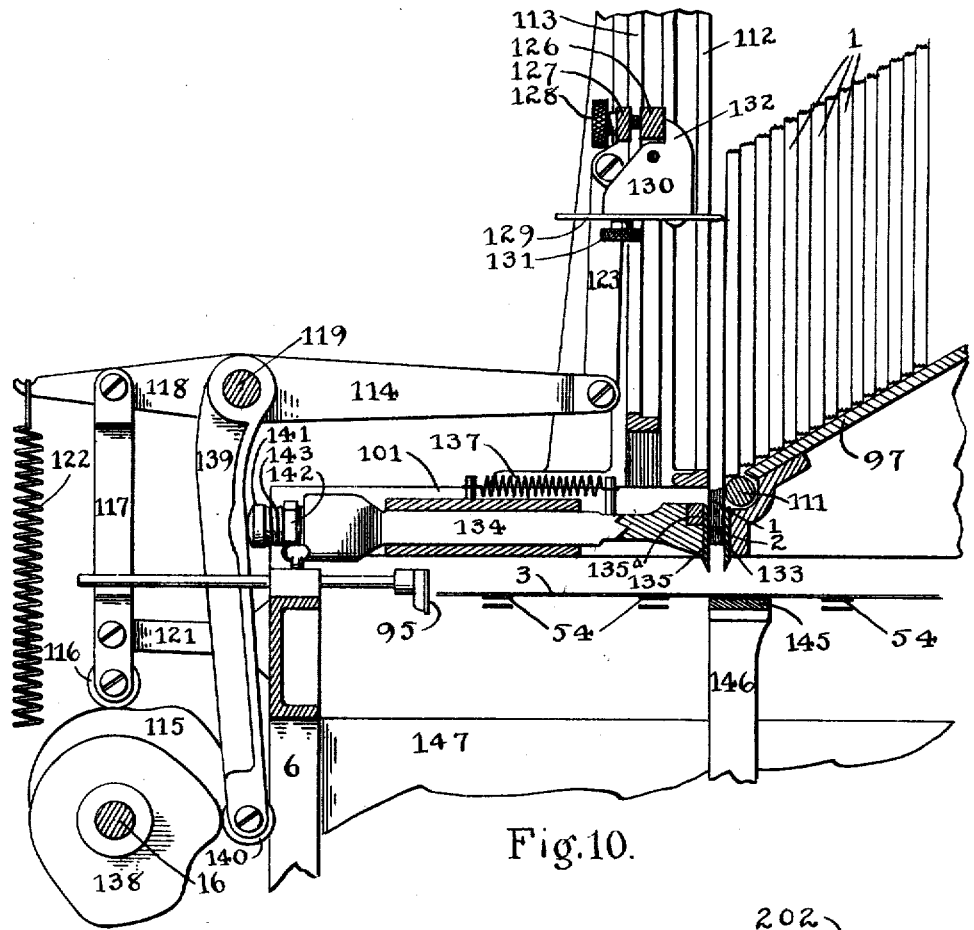
Fig. 10.
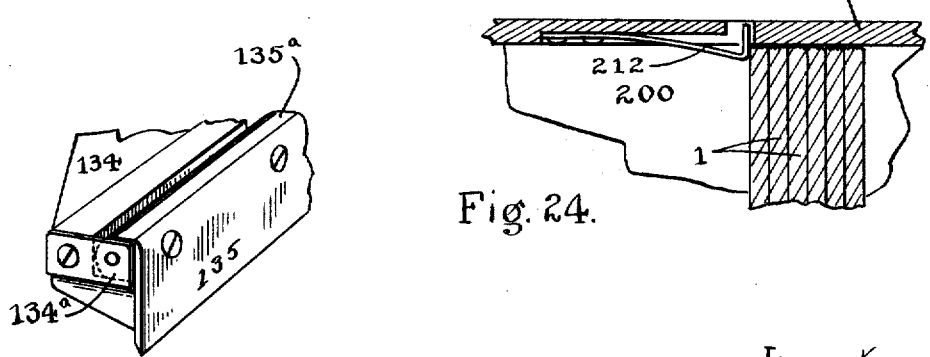
Fig. 23.
Fig. 24.
Inventor
Theodore S. Etheridge
By Moulton & Liverance
Attorneys.

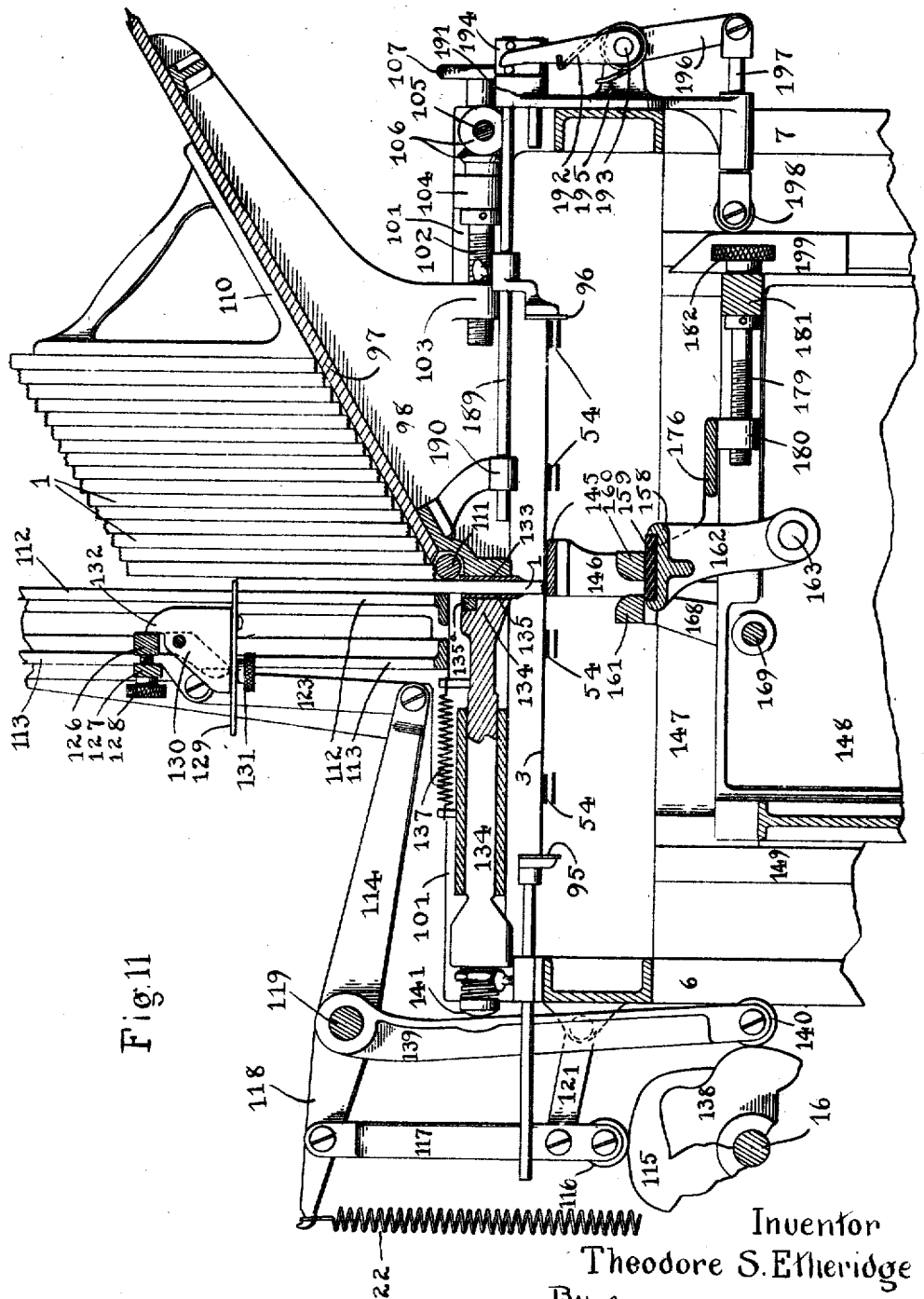

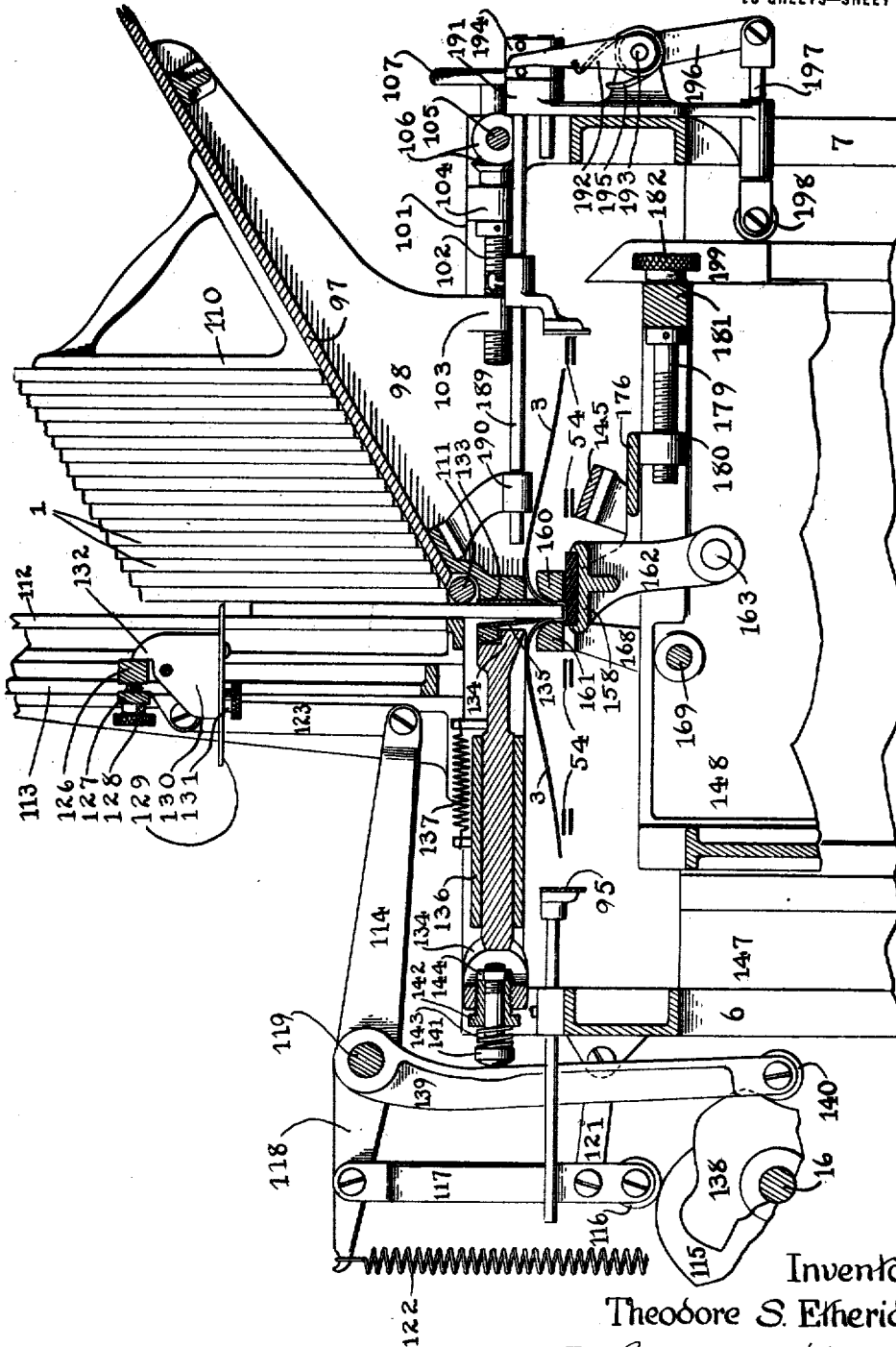

T. S. ETHERIDGE.
BOOK COVERING MACHINE.
APPLICATION FILED MAR. 31, 1917.

1,297,131.

Patented Mar. 11, 1919.
16 SHEETS—SHEET 10.

Inventor
Theodore S. Etheridge
By Moulton & Liverance
Attorneys

Inventor
Theodore S. Etheridge
By Moulton & Limrance
Attorneys.

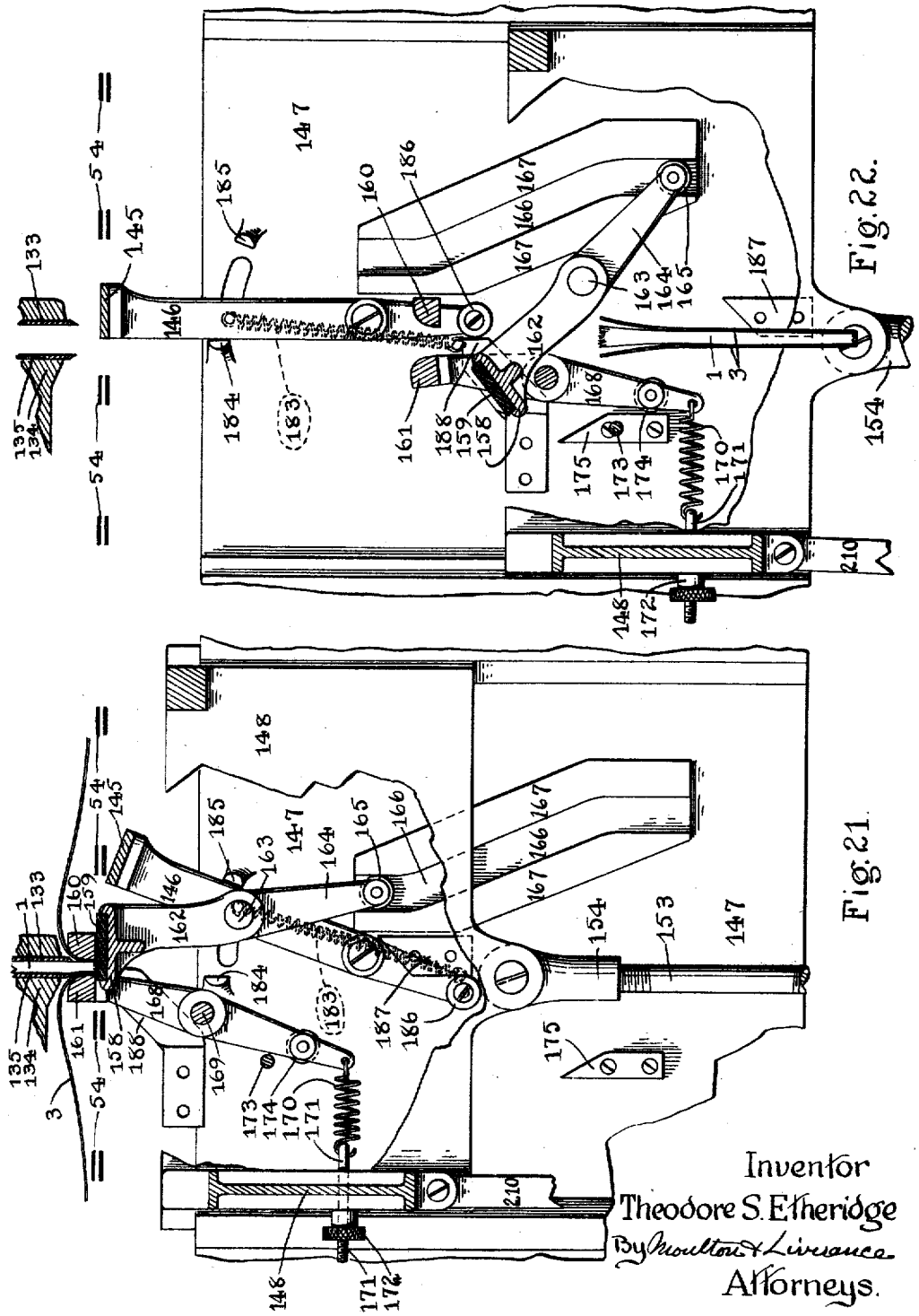

UNITED STATES PATENT OFFICE.

THEODORE S. ETHERIDGE, OF GRAND RAPIDS, MICHIGAN.

BOOK-COVERING MACHINE.

1,297,131.  Specification of Letters Patent.  Patented Mar. 11, 1919.

Application filed March 31, 1917. Serial No. 158,987.

*To all whom it may concern:*

Be it known that I, THEODORE S. ETHERIDGE, a citizen of the United States of America, residing at Grand Rapids, in the county of Kent and State of Michigan, have invented certain new and useful Improvements in Book-Covering Machines; and I do hereby declare the following to be a full, clear, and exact description of the invention, such as will enable others skilled in the art to which it appertains to make and use the same.

This invention relates to improvements in automatic book covering machines and more particularly to such machines adapted to automatically perform the complete operation of affixing paper covers to books, pamphlets and the like by gluing them thereto.

In the art of book binding it is customary to prepare the books or pamphlets for the cover by fastening together the various leaves or signatures, of which they are composed, by means of wire staples or stitching them together near their back portion. The cover is then affixed to the back by glue either applied to the back of the book or the cover. It is often desirable, more especially when the cover is of heavy stock to crease or score the same where it is to be folded over the corners of the back of the book so that the fold can be more easily and neatly made. It is also often desirable to apply the glue and secure the cover to a small portion of the sides of the book, adjacent its back, to cover the staples therein and to score the cover at the termination of this glued portion so that it will fold neatly back at that point.

In binding the books the sheets are not always compactly folded and when wire staples are used they are not uniformly clenched so that it is often necessary to subject the books to an additional pressing operation to uniformly shape the backs thereof properly to receive the covers.

The object of this invention is to provide a machine that will receive the cover sheets as they are fed manually to it and will score the sheet, apply the glue thereto and locate the sheet in the proper position to receive the book, to provide a hopper to receive a supply of books from which they are fed by automatic means, one by one their back portions being first automatically pressed to uniform thickness and then brought into engagement with the cover sheet, to provide means for folding and pressing the cover sheet about the back of the book and for conveying the completed book into a receiving hopper and to provide various means of adjustment of the different parts of the machine whereby it may be made to receive and operate upon books and covers varying in dimensions from the smallest to the largest commonly used.

The machine is also provided with various other novel features of construction and arrangements of parts as hereinafter more fully described and particularly pointed out in the claims. Referring to the accompanying drawings which illustrate the preferred embodiment of this invention:—

Fig. 10 is a transverse section of the book feeding and cover forming mechanism at the time when the book is engaged with the cover and clamped. Fig. 11 is an enlarged transverse section of a part of the book feeding mechanism illustrating the back pressing operation.

Fig. 12 is the same at the time the cover is formed about the back of the book and the book released.

Fig. 21 is a transverse sectional elevation of the cover forming mechanism in the position to form the cover about the book with parts broken away to show the cams and other means for moving the various parts.

Fig. 22 is the same with the parts moved to withdraw the covered book and deposit it into the receiving hopper.

Fig. 23 is an enlarged perspective view of one end of the movable book clamping jaw and, Fig. 24 is a sectional plan of a portion of the receiving hopper showing detail of the book retaining stop.

Like numbers refer to like parts in all of the figures.

Figure 1:
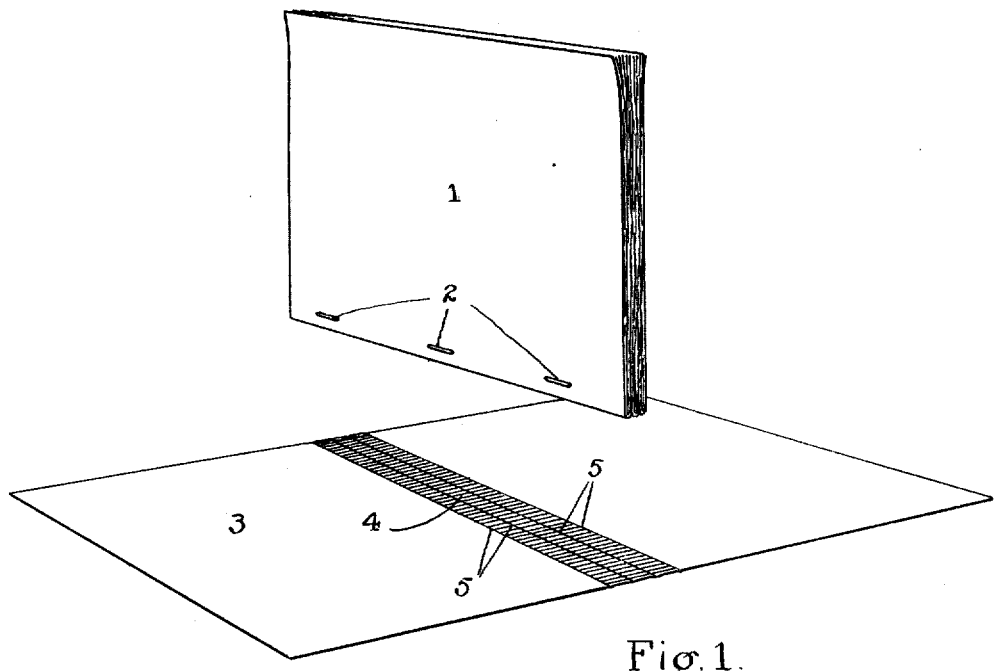
Figure 1 is a perspective view showing a book such as is to be covered and a cover sheet before affixing it to the book.
Figure 2:
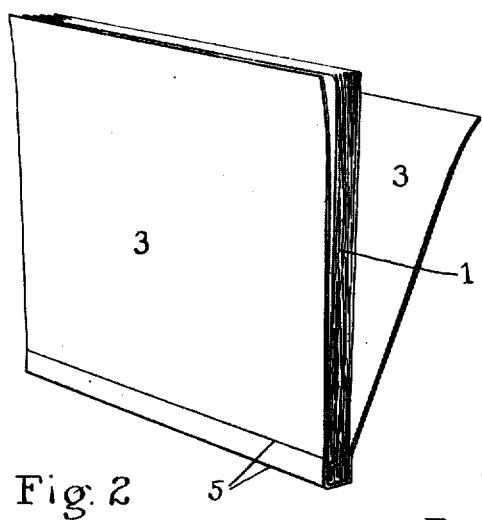
Fig. 2 is a perspective view of the covered book.
Figure 3:
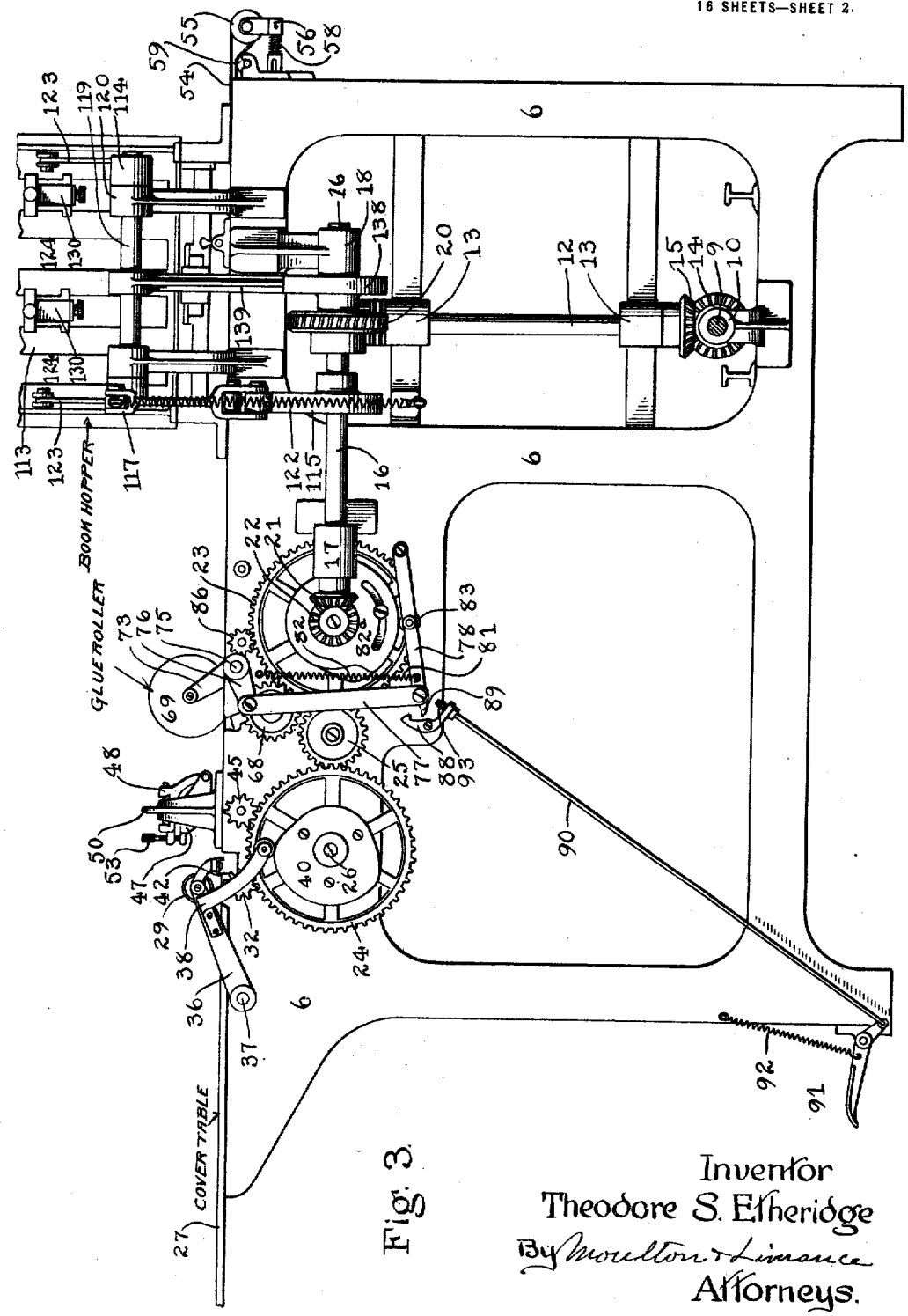
Fig. 3 is a side elevation of the machine with parts broken away and omitted for clearness.
Figure 4:
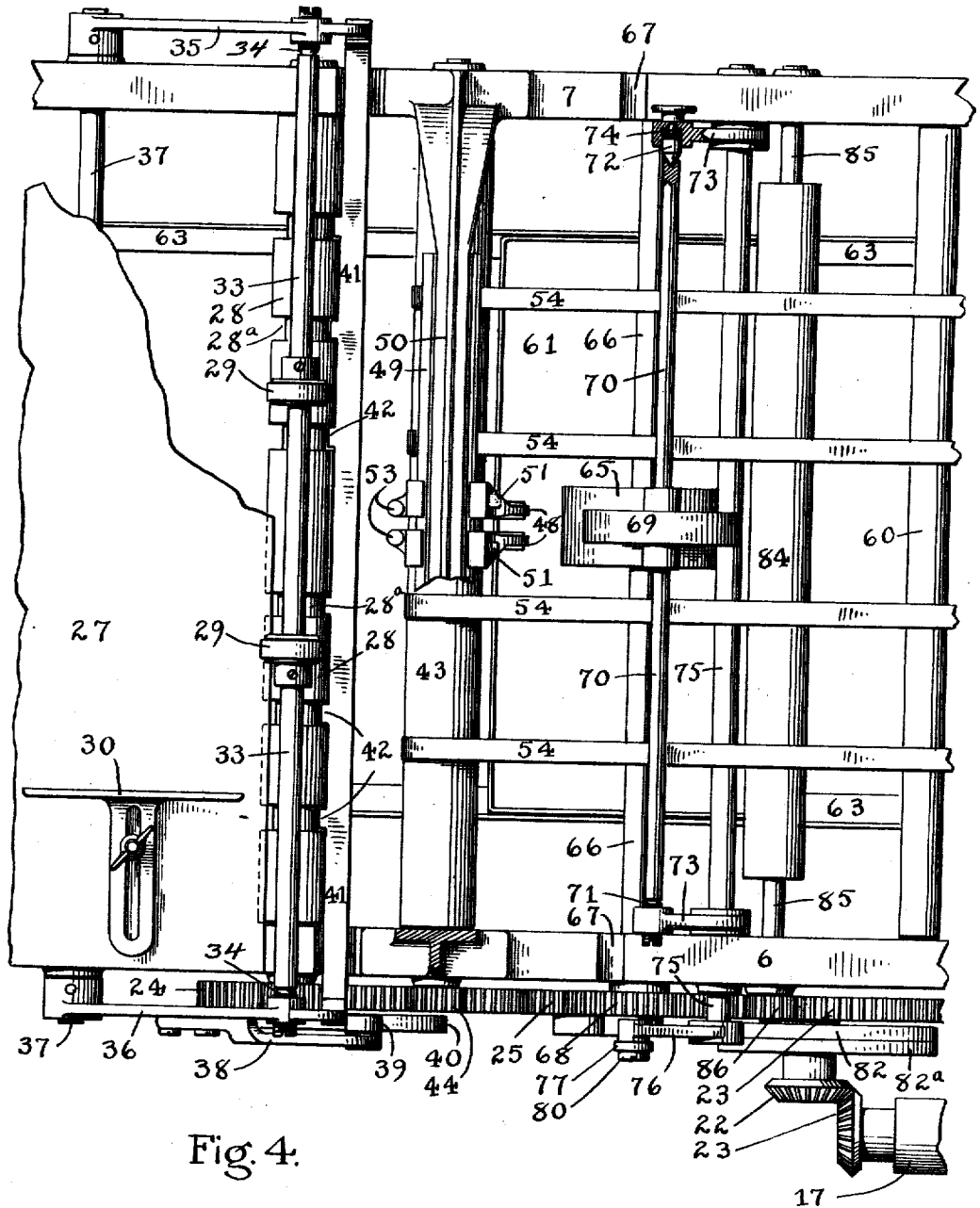
Fig. 4 is an enlarged plan view of the feeding, scoring and gluing part of the machine with parts broken away.
Figure 5:
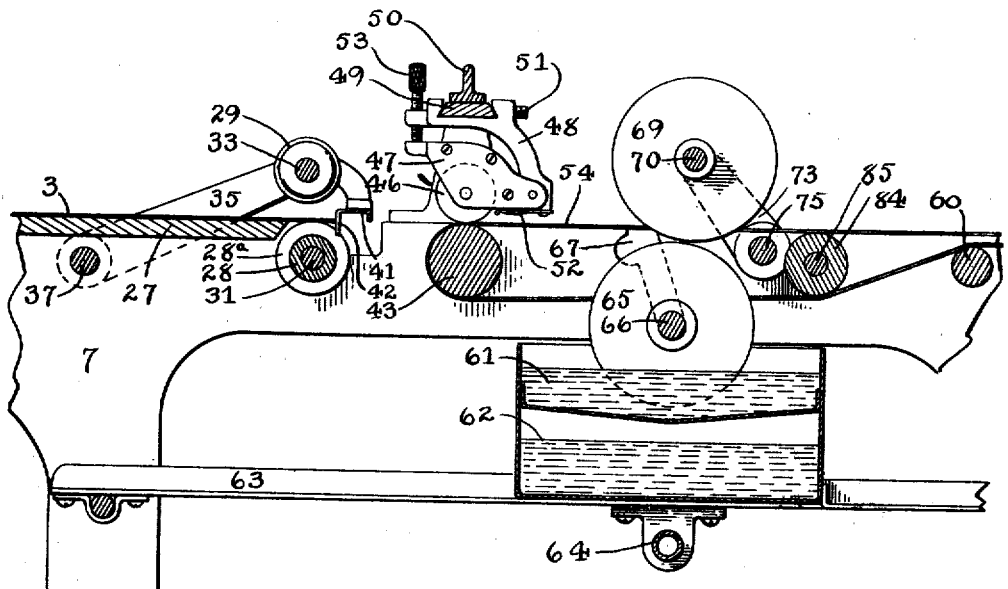
Fig. 5 is a longitudinal sectional elevation of the feeding, scoring and gluing part of the machine in the position for manually feeding the cover sheet.
Figure 6:
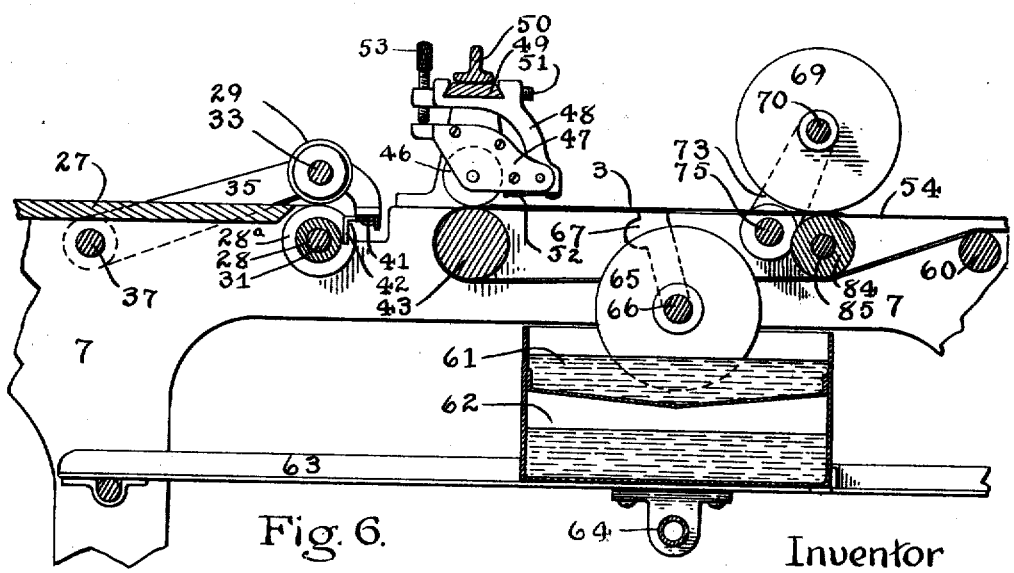
Fig. 6 is the same showing the parts shifted to feed and glue the sheet.
Figure 7:
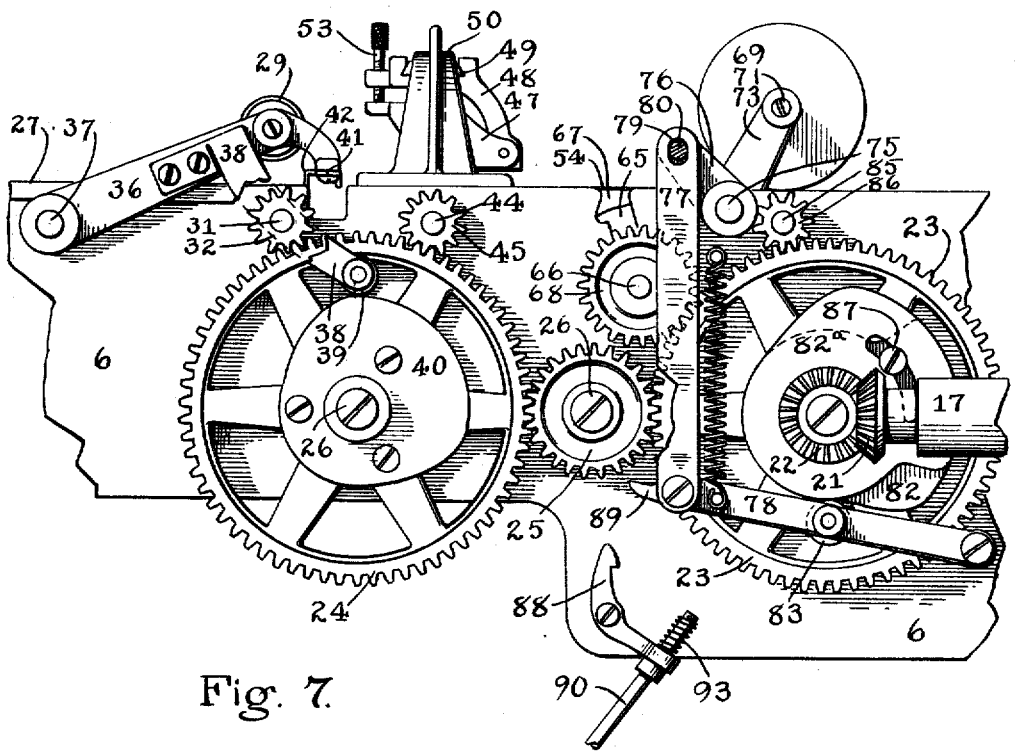
Fig. 7 is a side elevation of the feeding, scoring and gluing part of the machine illustrating details of the gearing, cams and other parts.
Figure 8:
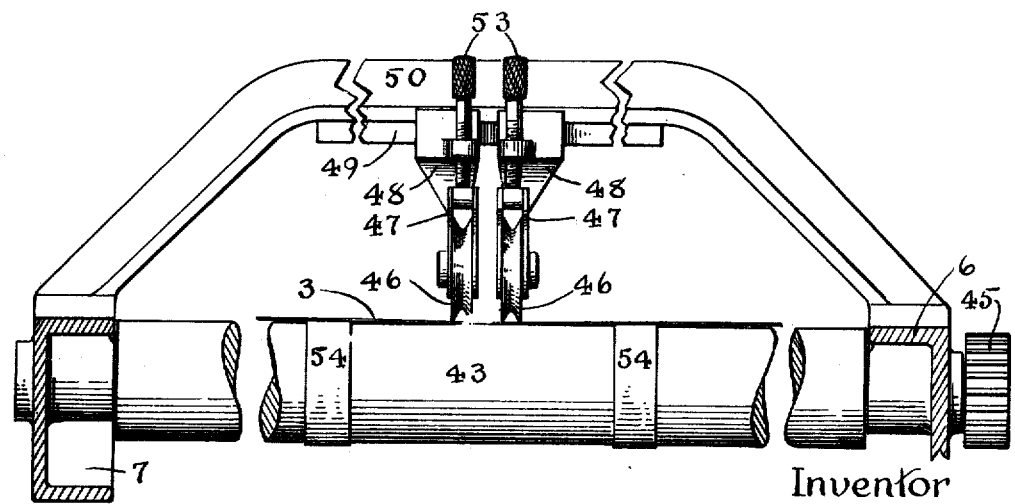
Fig. 8 is an enlarged transverse section, with parts broken away, of the scoring means.
Figure 9:
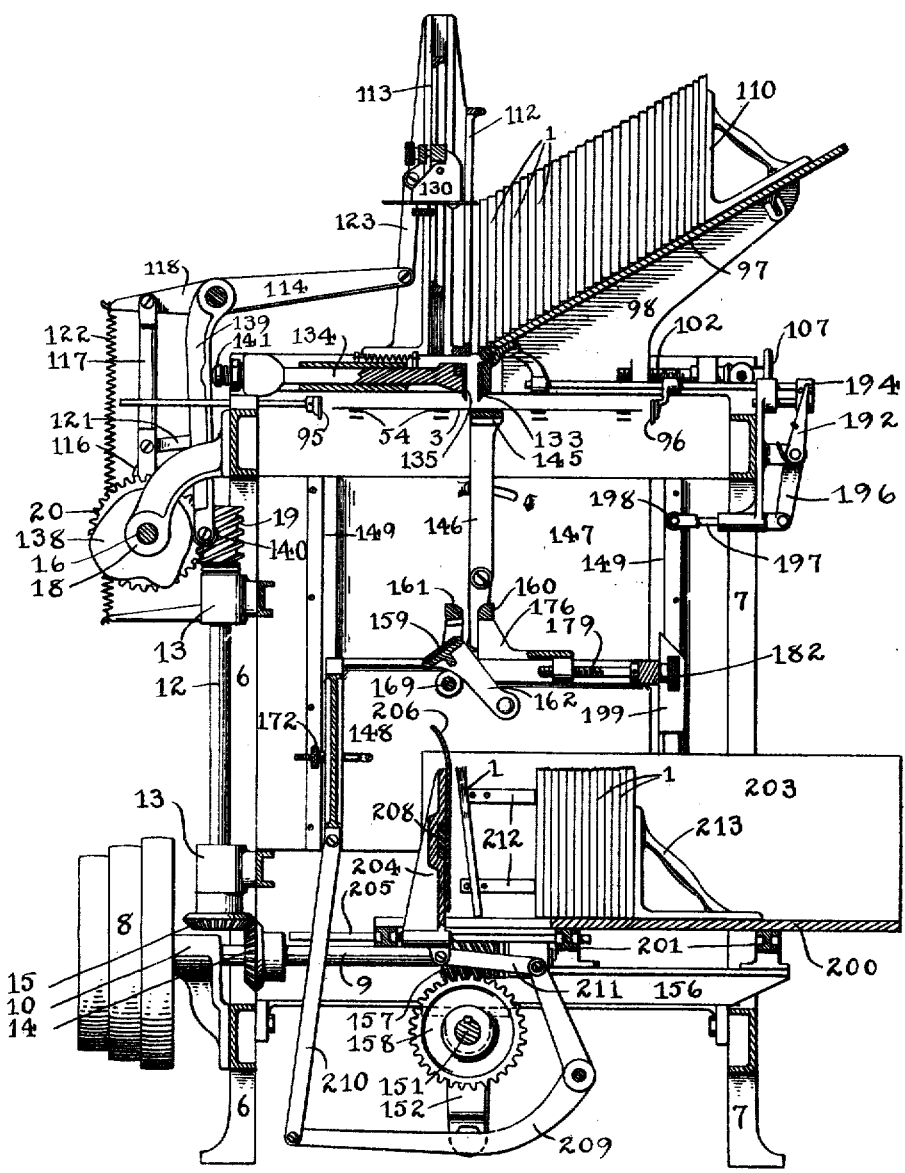
Fig. 9 is a reduced transverse sectional elevation of the book feeding and cover affixing part of the machine.
Figure 13:
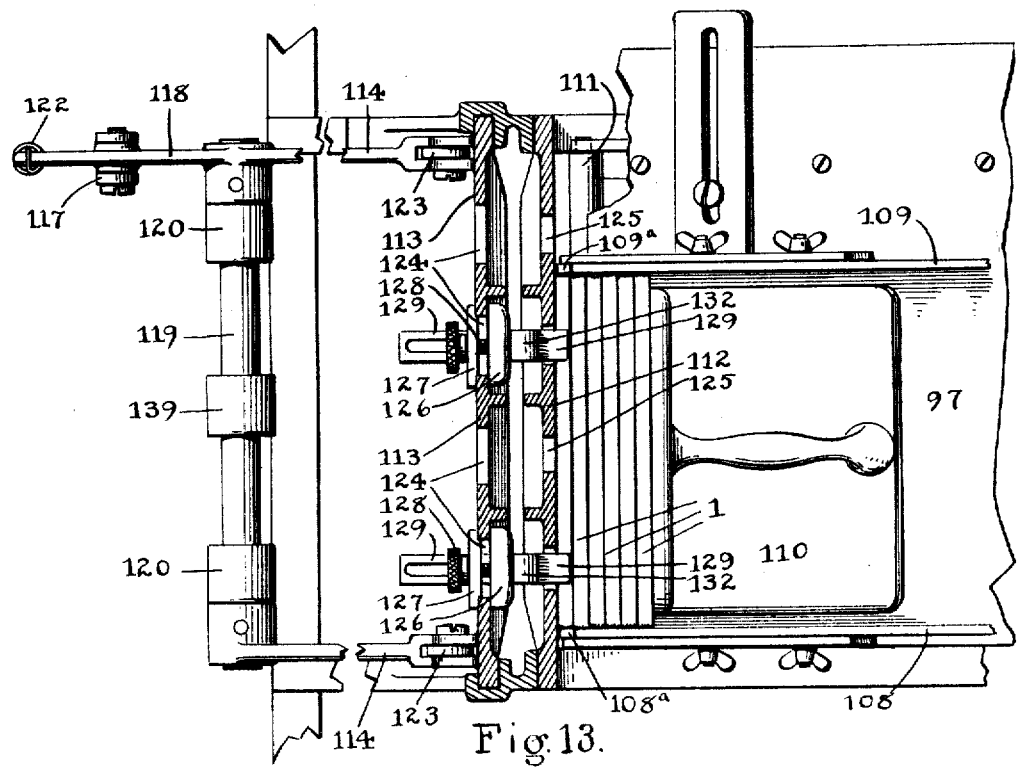
Fig. 13 is a plan view, with parts broken away and partially in section, of the book feeding mechanism.
Figure 14:
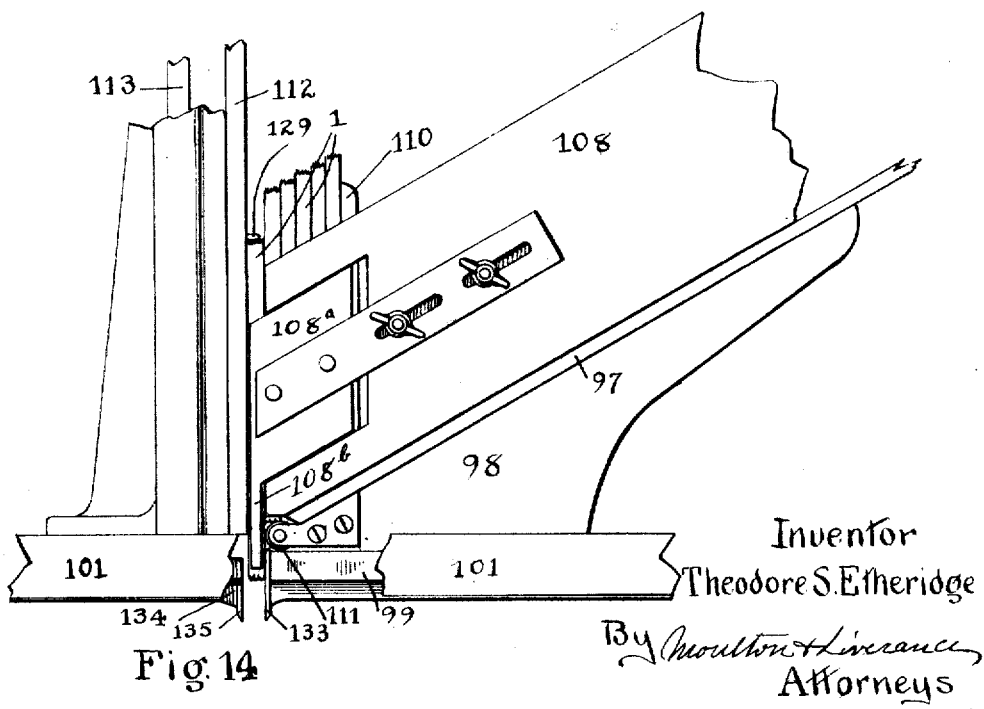
Fig. 14 is a fragmentary side elevation of the book hopper or holder.
Figure 15:
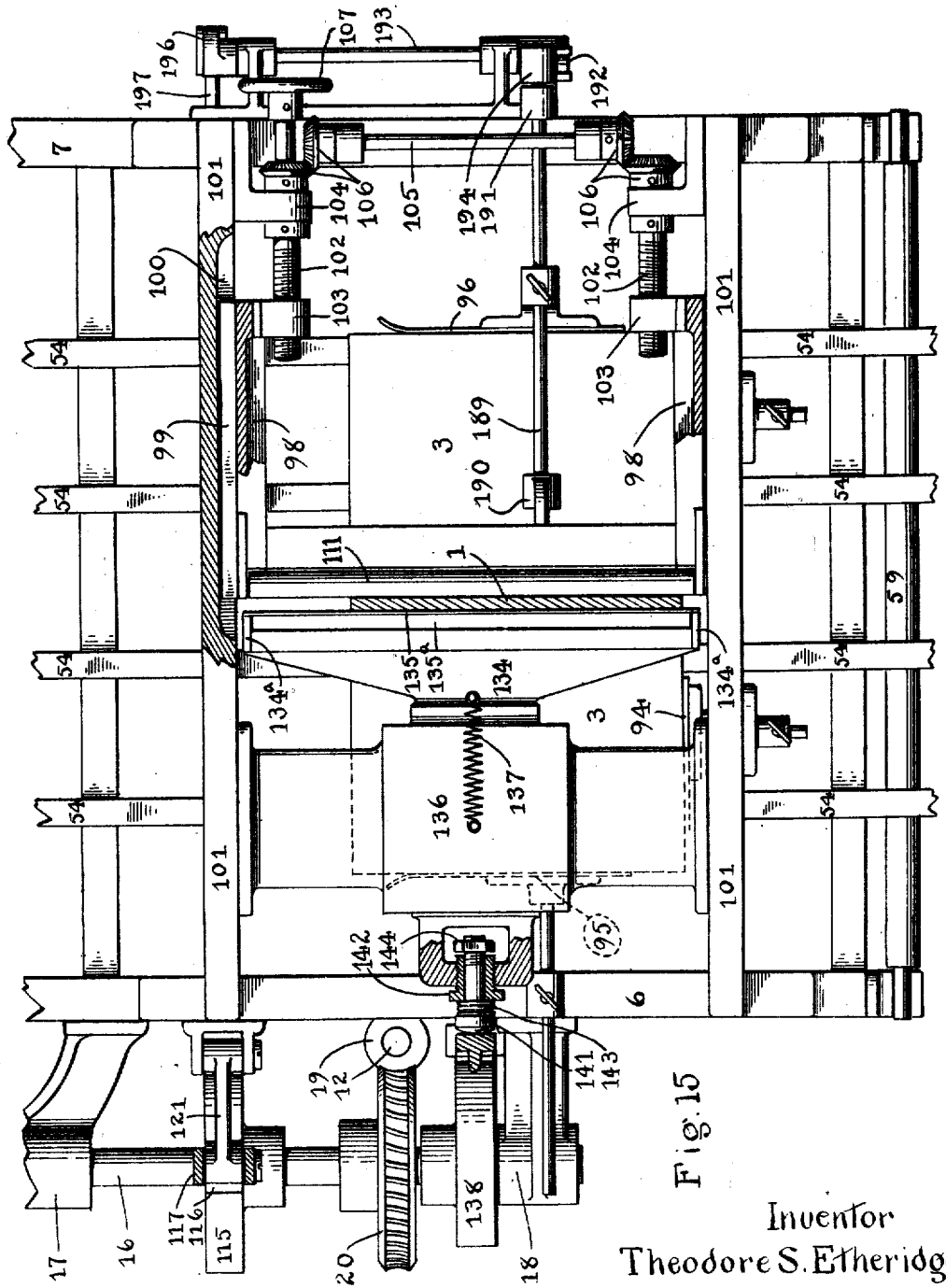
Fig. 15 is a plan view partially in section of the book clamping mechanism and other parts.
Figure 16:
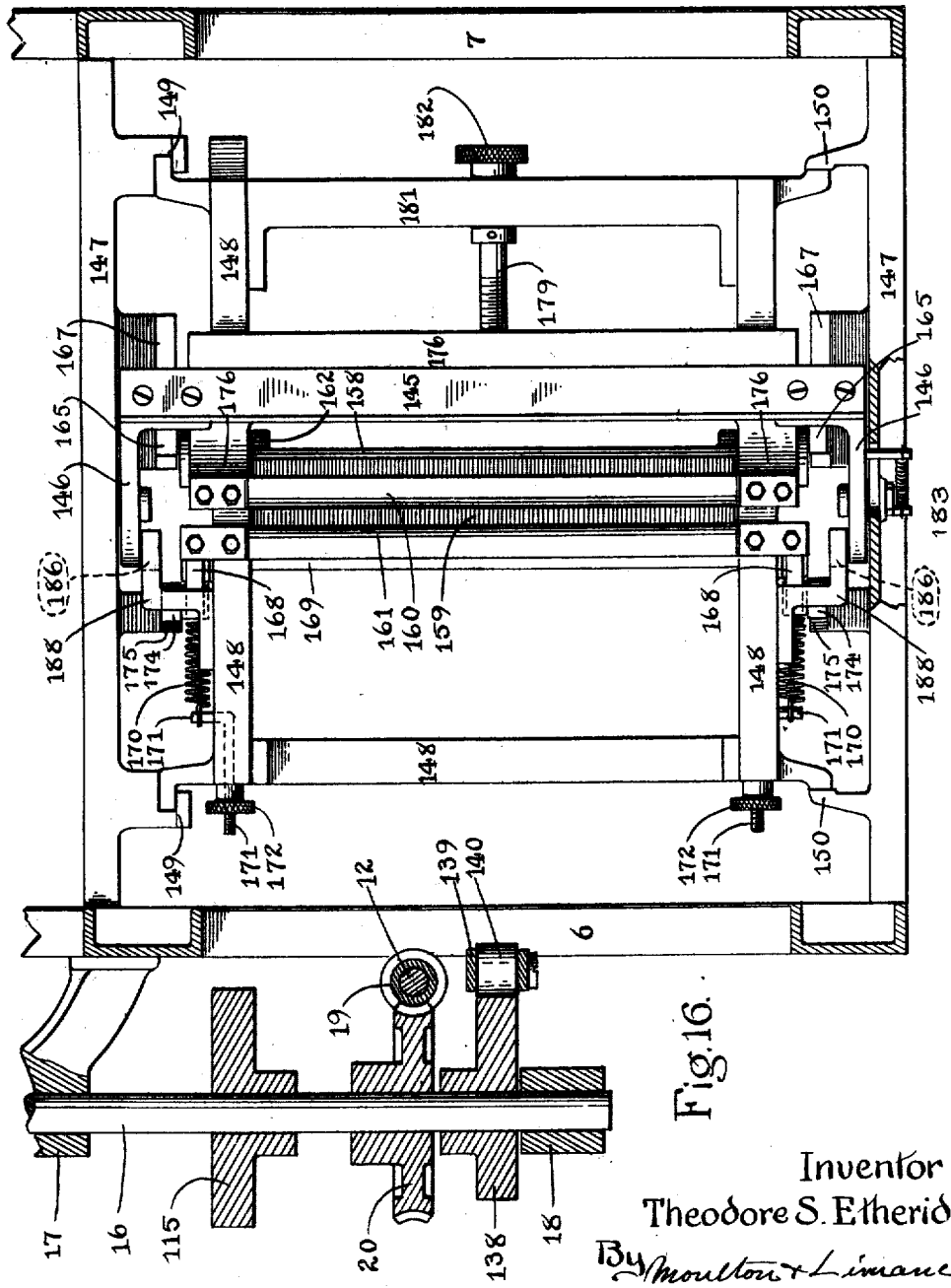
Fig. 16 is a sectional plan of the machine beneath the book clamping mechanism showing the cover forming mechanism and other parts.
Figure 17:
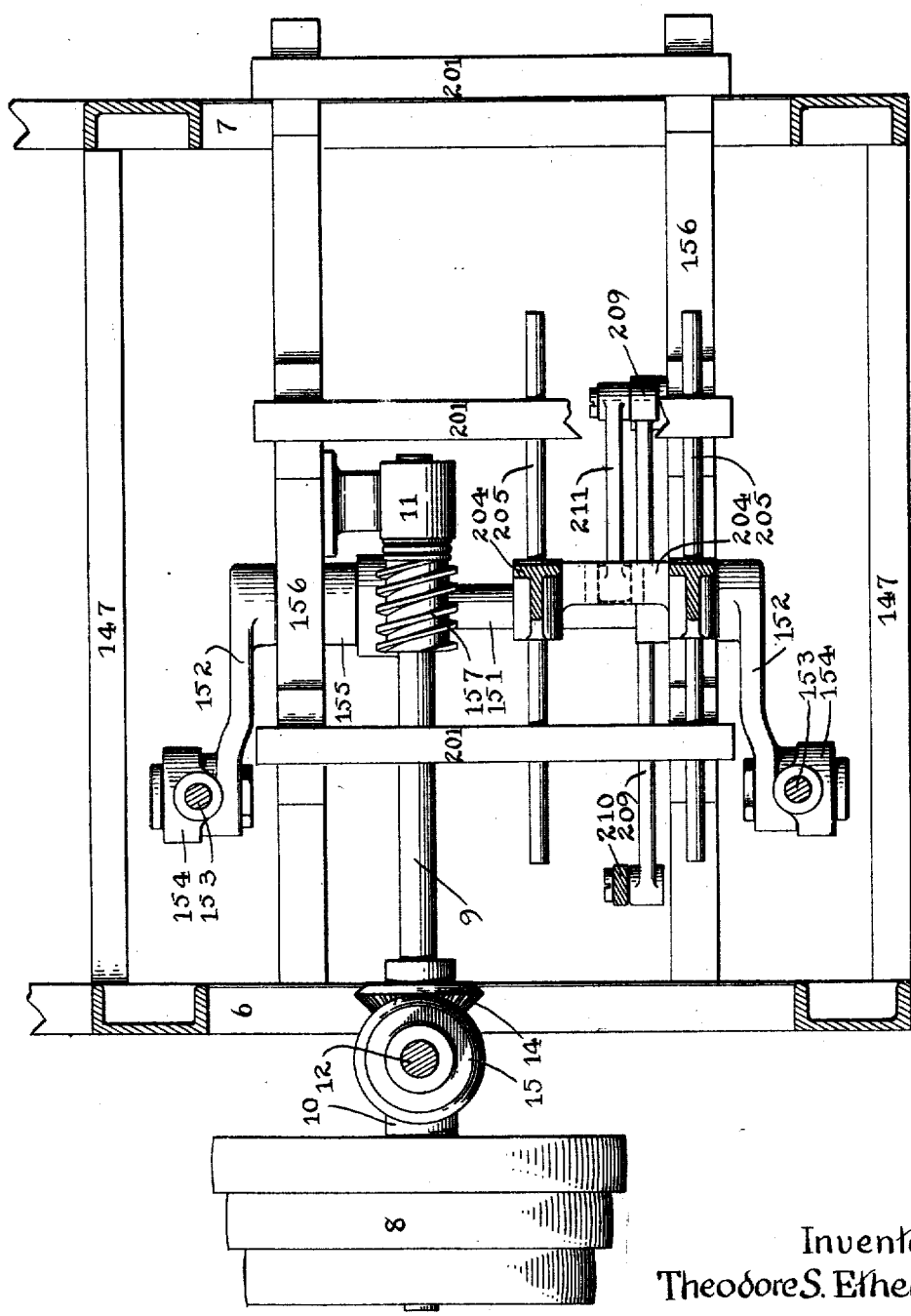
Fig. 17 is a sectional plan view of the machine showing details of the driving mechanism.
Figure 18:
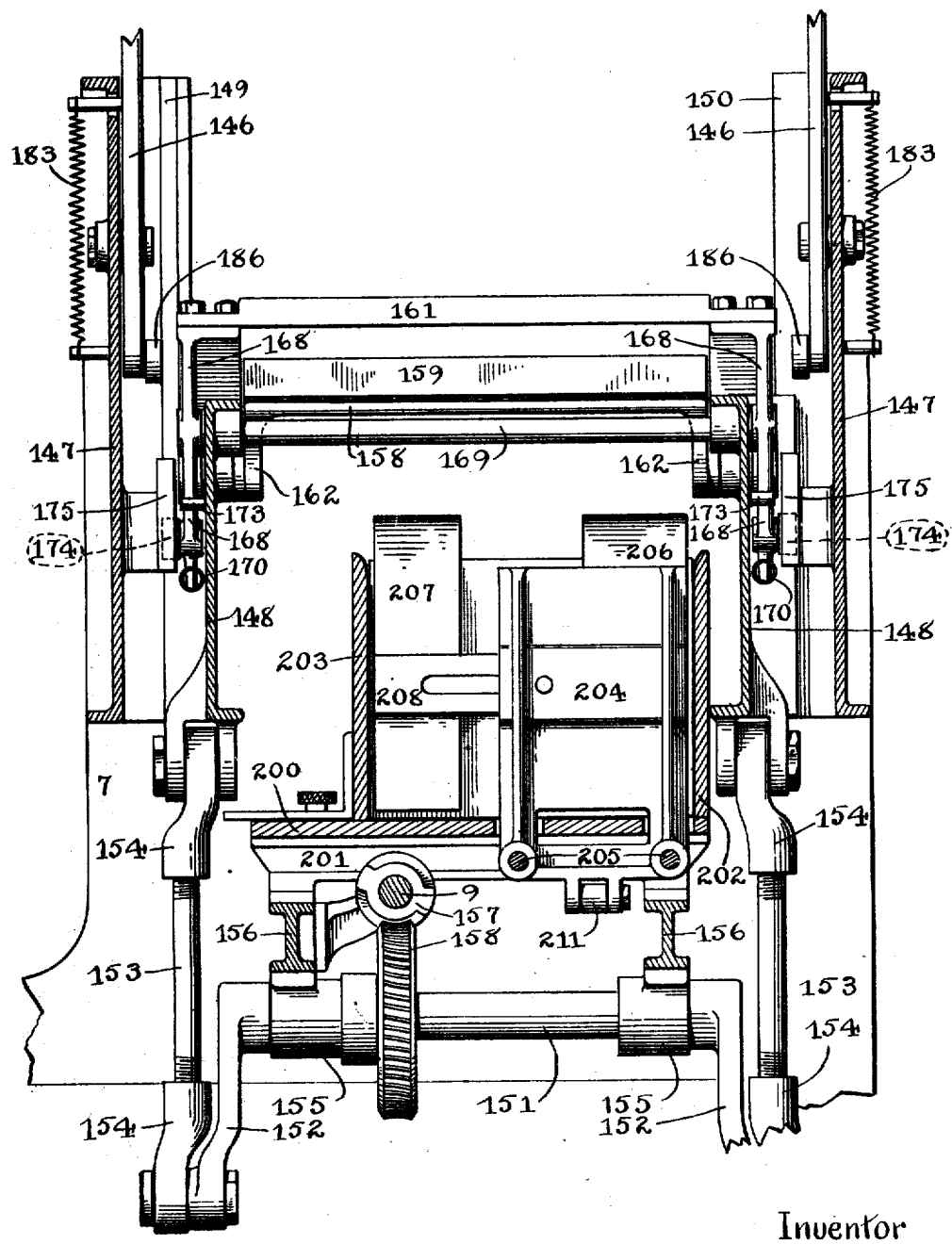
Fig. 18 is a longitudinal sectional elevation of the lower part of the machine with parts broken away showing the cover forming and driving mechanism and book receiving hopper.

1 represents the book comprising leaves fastened together by wire staples 2 near its back or by other means. 3 is the cover sheet the middle portion 4 of which is supplied with glue and 5 are the score lines adapting the cover to be folded easily and neatly over the corners of the back of the book and also outwardly at the termination of the glued portion of the sides when it is desired to cover the staples by gluing the cover to the small portion of the sides of the book.

6 and 7 represent the respective opposite main side frames of the machine. The main driving means comprises the pulley 8 fixed to the shaft 9 journaled in the bearings 10 and 11. The vertical shaft 12 journaled in bearings 13 is rotated from the shaft 9 through the miter gears 14 and 15, and the cam shaft 16 journaled in bearings 17 and 18 is rotated at reduced speed through the worm 19 on the shaft 12 and the worm gear 20 on the shaft 16. A miter gear 21 on the shaft 16 meshing with a miter gear 22 fixed to the large spur gear 23 rotates said gear 23 at the same speed as the shaft 16 and this motion is transferred to a similar large spur gear 24 of the same diameter as the gear 23 through the idler gear 25, the said gears 23, 24 and 25 being journaled on studs 26 fixed to the frame 6.

27 is a feeding table from which the cover sheets are manually fed to the feeding rollers 28 and 29 and a stop 30 is adjustably mounted on the table to guide the sheets laterally to the said feeding rollers.

The roller 28 is journaled on its shaft 31 in the side frames 6 and 7 and is continuously rotated by the pinion 32, which meshes with the large gear 24. The rollers 29 commonly called drop rollers are mounted upon a shaft 33 which is rotatably hung upon center points 34 projecting into the respective recessed ends of the shaft and respectively mounted upon arms 35 and 36 at each side of the machine. The arms 35 and 36 are fastened to the respective ends of the rock shaft 37 mounted on the frame causing them to move simultaneously. An extension arm 38 attached to the arm 36 and carrying at its extremity a cam roller 39 which is engaged by the cam 40 fixed to the gear 24, causes the arms to swing and periodically raise or lower the drop rollers away from or into engagement with the feed roller 28, the rising motion being caused by the cam action and the lowering motion by gravity. A bar 41 extends transversely of the machine behind the roller 28 and is attached to and moved with the arms 35 and 36. Stop fingers 42 extend from the said bar preferably into recesses 28ᵃ in the feed roller 28 and are so arranged that when the arms 35 and 36 and drop rollers 29 are raised they will lie in the path of the cover sheet acting as a stop for the same as it is manually fed over the constantly rotating roller 28; and when the arms 35 and 36 drop, the bar 41 and stop fingers 42 are lowered beneath the plane of the cover sheet and the drop rollers 29 engaging its upper surface cause sufficient frictional contact with the roller 28 to move the sheet forward.

The scoring drum 43 is mounted next to the feed rollers and parallel therewith and is journaled on trunnions 44 in the frame being driven by a pinion gear 45 which meshes with the gear 24. The scoring rollers 46 two of which are provided are rotatably mounted in frames 47 pivotally hung on brackets 48. Each bracket 48 is slidable transversely of the machine on a dove-tail way 49 attached to a bridge support 50 connected to the side members of the frame of the machine. Clamping screws 51 are provided to fix the brackets at the desired location on the way 49. The frames 47 are normally raised by springs 52 engaging their lower edges and attached to brackets 48 and are lowered to bring the scoring rollers against the cover sheet as it passes over the drum 43, by means of pressure screws 53 threaded in the brackets 48 and engaging the frames 47. Each scoring roller 46 is preferably provided with two scoring edges which engage and score the cover sheet as it passes over the drum 43, the inner edges producing the scored lines at the corners of the back of the book and the outer edges producing the scored lines at the termination of the glued surface on the sides of the book. By adjusting the brackets 48 the space between the inner edges of the respective scoring rollers may be varied for books of different thicknesses and the space between the inner and outer edges of each respective roller which governs the width of the glued portion on the sides of the book remains on all books the same.

Endless conveying tapes 54 are passed around the scoring drum 43 being driven by frictional contact therewith and they receive the cover after it has been scored and convey it successively through the gluing mechanism and into the cover-forming part of the machine. The tapes are returned over sheaves 55 at the rear end of the machine and said sheaves being carried in blocks 56 slidably mounted on brackets 57 attached to the frame of the machine. The sheaves are yieldably pressed outward by the springs 58 to maintain a tension on the tapes. The lower or return sides of the tapes run over rollers 59 and 60 which hold them out of the way of moving parts of the machine.

The gluing mechanism is adapted to apply a coating of glue to a longitudinal strip of the cover on the top side thereof. The glue pot 61 having a water reservoir 62 beneath it and integral therewith is supported on ways 63 between the side members of the frame and may be withdrawn for cleaning and filling. A gas burner 64 hung on said ways 63 extends beneath the water reservoir being supplied with gas by a flexible pipe not shown. A glue supplying wheel 65 is fixed to the shaft 66 which is journaled in the side members 7 and 6 of the frame preferably resting in the lower ends of slots 67 in the frame said slots being open at their upper ends to permit the shaft to be removed. A gear 68 attached to the shaft 66 and meshing with the gear 23 rotates said shaft and by virtue of its direction of rotation the thrust from the gear 23 to the gear 68 is downward so that the shaft 66 will need no retaining means to hold it in its slotted bearing.

The glue supplying wheel 65 has its lower portion immersed in the glue in the glue pot and the upper side of its periphery is beneath the conveying tapes so that the cover sheet will not engage the glue wheel as it passes over the same. A glue transferring wheel 69 is mounted above the glue supplying wheel on a shaft 70 which is rotatably hung on pointed studs 71 and 72 on arms 73. The stud 72 is slidable in the arm 73 being pressed into the tapered recess in the end of the shaft 70 by a spring 74 and may be disengaged from the shaft to permit the same to be removed. The arms 73 are fixed to the rock shaft 75 which is mounted in the frame and is provided at one end with an arm 76. A connecting rod 77 connects the arm 76 with the lever 78 one end of which is pivoted to the frame. A small sliding movement of the connecting rod 77 relative to the arm 76 is permitted by the slot 79 in the rod through which the stud 80 on the arm passes.

The lever 78 is moved upward by a spring 81 and forced downward by a cam 82 on the gear, 23, the cam engaging a cam roller 83 mounted on the lever. A supporting roller 84 extends transversely of the machine its shaft 85 being journaled in the frame and provided with a pinion gear 86 which meshes with the gear 23 constantly rotating the roller.

It will be seen that, by action of the cam 82, lever 78, connecting rod 77 and arm 76, the shaft 75 may be rocked to swing the glue applying roller 68 into engagement with the glue supplying roller 65 in which position its periphery is coated with glue and into another position to engage the upper surface of the cover sheet as it passes over the supporting roller 84.

The movement of the roller 69 is timed relative to the movement of the drop roller 29 so that it will rise out of the path of the sheet just before the sheet reaches it. This movement is caused by the spring 81 which moves the lever 78 when the cam roller 83 traverses the inward incline of the cam 82 and the cam is so shaped that the roller 69 will not reach the limit of its movement over the roller 84 until the cover sheet is interposed between the two rollers and as the cover moves beneath the roller 69 glue is transferred to its top surface from the periphery of the roller. The supporting roller 84 engages the outer surface of the cover and it must be kept clean and the roller 69 at no time allowed to engage it. It is therefore necessary to lift the roller 69 just before the cover passes from beneath it and as the covers are of various lengths the cam 82 is adjustable to accommodate such variation. The outward incline of the cam, which raises the roller 69 from the sheet is formed on a member 82$^a$ adjustable concentric with the main portion of the cam 82 and clamped thereto at the desired position by the screw 87. By adjusting the member 82$^a$ the length of the cam surface governing the time that the roller 69 is in engagement with the cover, may be lengthened or shortened.

It is not desirable to press the roller 69 either against the cover sheet or the roller 65 with great force and for this reason the cam 82 is so shaped that it will not complete the movement of the rock shaft 75 in either direction, these movements being completed by gravity and allowed by the slidable connection of the arm 76 with the connecting rod 77, the weight of the roller 69 and shaft 71 giving sufficient pressure in either position.

The operator will occasionally neglect to feed a cover sheet at the proper time and if the machine were allowed to operate on such occasion the roller 69 would engage the roller 84 and apply glue thereto. To prevent this a catch 88 is pivoted to the frame and arranged to engage an extension 89 on the lever 78 to prevent movement of the lever by the spring 81 when the cam releases the roller 83. The catch is preferably operated by a rod 90 connected to a pedal 91 and a spring 92 attached to the pedal is preferably arranged to normally hold the catch in engagement with the extension 89. By this arrangement the operator must hold the pedal down while the machine is operating and release the pedal to make the glue roller inoperative. Should the catch be moved into the path of the extension 89 while the same is in raised position the catch will be moved back by engagement with the extension as it moves downward, this motion being permitted by the spring 93 which yieldably connects the rod 90 to the catch 88 and immediately returns it to operative positions.

After being scored and glued the cover is conveyed on the tapes 54 into the cover forming and fixing part of the machine. The cover engages the end stops 94 which stop its longitudinal movement and adjust it in proper longitudinal position relative to the books a supply of which are carried in a feeding hopper above the cover. The center line of the books and covers in the cover forming part of the machine is offset to one side of the center line of the covers as they are in the scoring and gluing mechanism and after the cover has been stopped by the end stops 94 it is moved laterally against the adjustable side stop 95 by the pusher 96 operated as hereafter described thus alining it centrally relative to the book to be engaged with it.

The book feeding hopper located above the cover has an inclined bottom 97 mounted on supports 98 and slidable transversely of the machine. The supports 98 are provided with tongues 99 which traverse the grooves 100 in the cross beams 101 of the frame.

Adjusting screws 102, threaded into lugs 103 on the respective supports 98 and having bearings in lugs 104 on the cross beams 101 serve to move and adjust the hopper and the screws are rotated in unison by a shaft 105 extending between them and connected by miter gears 106 at its respective ends with the screws. A hand wheel 107 is provided on one screw to turn it.

The hopper has a fixed end 108 and a movable end 109 which may be moved to adjust the hopper to receive books of various lengths, the books being vertically disposed in the hopper with their backs down and they will slide by gravity to the low side thereof being aided to slide and retained upright by a follower 110. The low edge of the hopper bottom 97 terminates in a longitudinal freely rotative roller 111 which aids the backs of the books to move freely as they pass over it. A vertical face plate 112 mounted on the cross beams 101 extends across the open lower end of the hopper and is engaged by the lower book therein and the space between the edge of the hopper and the face plate may be adjusted by the screws 102 so that a book will pass between them. An extension plate 108ª is slidably attached to the hopper end 108 and is extended to engage the face plate 112 as the hopper is adjusted and a guide tongue 108ᵇ extends downward from the plate 108ª between the hopper and face plate. A similar extension plate 109ª is also provided on the movable hopper end 109 and is similarly adjustable and this plate is provided with a spring tongue 109ᵇ which yieldably projects into the path of the book, engaging one end thereof as it is moved downward to insure the engagement of its opposite end with the guide tongue 108ᵇ.

Means to feed the books by pushing them one at a time through the space between the hopper and face plate is provided and comprises a vertical slide 113 back of the face plate 112 operated by arms 114 from a cam 115 on the shaft 16. A cam roller 116 is mounted on the lower end of a push rod 117 and engages the cam 115. The upper end of the push rod 117 is connected to an extension 118 on one of the arms 114 and both arms 114 are fixed to a rock shaft 119 mounted in hangers 120 fastened to the frame of the machine. The lower end of the push rod 117 is guided by a connecting link 121 attached to the frame which permits it to move vertically. A spring 122 attached at one end to the extension 118 and at its other end to the frame serves to move the arms 114 in the opposite direction from that in which they are moved by the cam 115. Connecting rods 123 connect the ends of the arms 114 to the slide 113.

The slide 113 is provided with a plurality of vertical slots 124 in which the book pushers are mounted and these pushers extend through similarly disposed slots 125 in the face plate 112 there being more slots 124 and corresponding slots 125 than the number of pushers used. Brackets 126 lie within the slots 124 and engage the slide 113 being vertically adjustable thereon and clamped thereto by clamping bars 127 and screws 128. The pushing fingers 129 are fixed to the lower surfaces of blocks 130 pivotally mounted on brackets 126 and are horizontally adjustable thereon being clamped by screws 131. These pusher fingers extend through the slots 125 in the face plate 112 and engage the top edges of the book to be fed and push it down through the opening between the face plate and hopper the fingers 129 being extended beyond the face plate only far enough to engage one book. During the pushing movement the pivoted blocks 130 are prevented from oscillation by the stop 132 on each one which engages its respective bracket 126 but on the return movement the blocks are free to oscillate in the reverse direction should the pusher fingers engage the surface of a book in the hopper thereby allowing the said fingers to be retracted to the surface of the face plate.

A stationary pressure jaw 133 is formed integral with the adjustable hopper and has its vertical surface in alinement with the periphery of the roller 111 and its lower edge is spaced away from the plane of the cover sheet approximately the distance equal to the width of the glued portion of the cover to be affixed to the sides of the book.

A movable pressure jaw 134 having its vertical clamping face 135 oppositely disposed to that of the jaw 133 is slidably mounted in a way 136 which is supported by the cross beams 101. This jaw is yieldably retracted by a light spring 137 and is forcibly thrust forward by the cam 138 on the cam shaft 16 through the following parts: A lever 139 is pivotally supported at its upper end on the rock shaft 119 and has the cam roller 140 at its lower end to be engaged by the cam 138. A plunger 141 engages the lever 139 between its ends and is slidable in a bushing 142 screwed into the body of the jaw 134. A spring 143 having resistance sufficient to give the jaw 134 the desired pressing force, surrounds the stem of the plunger 141 engaging at its ends the head of the plunger and the bushing. When the lever 139 is moved by the cam 138 the face of the jaw 135 will be thrust against a book interposed between it and the jaw 133 and squeezed with a pressure equal to that of the spring 143. The spring tension may be adjusted by turning the nut 144 on the stem of the plunger and the position of the jaw may be adjusted by turning the threaded bushing 142 in or out. The face plate 135 is hinged to the jaw 134 preferably being attached to a block 135$^a$ (Fig. 23) which lies in a recess in the jaw and is pivotally connected at its ends to the jaw by plates 134$^a$. This arrangement permits the face plate to take the full pressure of the jaw during the pressing stroke but allows the lower edge to swing freely away from the jaw on the return movement.

A swinging stop member 145 is longitudinally arranged under the central portion of the cover sheet, being supported at its ends by arms 146 which are pivoted to the cross members 147 of the frame. This stop member serves to stop and support the cover sheet when the back of the book is engaged with it and is adapted to be swung, by means hereafter described, from beneath the central portion of the cover sheet after the book has engaged it.

A cross head 148 is vertically movable beneath the cover sheet being guided in ways 149 and 150 on the cross members 147. This cross head is reciprocated from a crank shaft 151 by cranks 152 fixed to the ends of the crank shaft and connected to opposite ends of the cross head by connecting rods 153. Each connecting rod has at its ends the bearing members 154 to which it is connected by right and left hand threads respectively and the length of the connecting rod may thus be adjusted by turning it in its bearing ends. The crank shaft 151 is journaled in bearings 155 attached to cross beams 156 of the frame of the machine, and is rotated from the shaft 9 by a worm 157 on the shaft 9 and a worm gear 158 on the crank shaft. The ratio of the worm and gear 157 and 158 being the same as that of the worm 19 and gear 20, the crank shaft 151 is rotated at the same speed as the cam shaft 16, both completing a cycle during the same period.

A cover-breaker is mounted on the cross head 148 and comprises a swinging bottom 158 having a resilient pad 159, an adjustable side 160 and a movable side 161. The bottom 158 is supported at its ends on arms 162 pivoted on trunnions 163 having bearings in the end of the crosshead 148. The trunnions 163 extend through the ends of the crosshead and are provided with arms 164 which lie between the ends of the cross head and the cross members 147 of the frame. The arms 164 are provided at their lower ends with cam rollers 165 which traverse cam slots 166, formed between the bars 167 attached to the respective cross members 147, as the cross head is reciprocated thus swinging the die bottom 158 from one position to another. The movable side 161 of the die is mounted at its ends upon the upper ends of levers 168 which are located between the ends of the cross head 148 and the cross members 147 of the frame. The levers 168 are fixed to the opposite ends of a rock shaft 169 mounted in and extending longitudinally across the cross head and the rock shaft forms a fulcrum for said levers. Springs 170 are attached to the lower ends of the levers 168 and also to rods 171 adjustably mounted on the cross head 148 preferably by passing through the frame thereof and provided with adjusting screws 172 and these serve to yieldably pull the lower ends of the levers 168 against stop pins 173 projecting from the cross head, thus moving the side 161 of the die yieldably into operative position. A cam roller 174 is provided on each lever 168 near its lower end adapted to be engaged by cams 175 located on the respective cross member 147 when the cross head is near the bottom of its stroke to move the die side 161 away from the side 160 and out of operative position.

Figure 19:
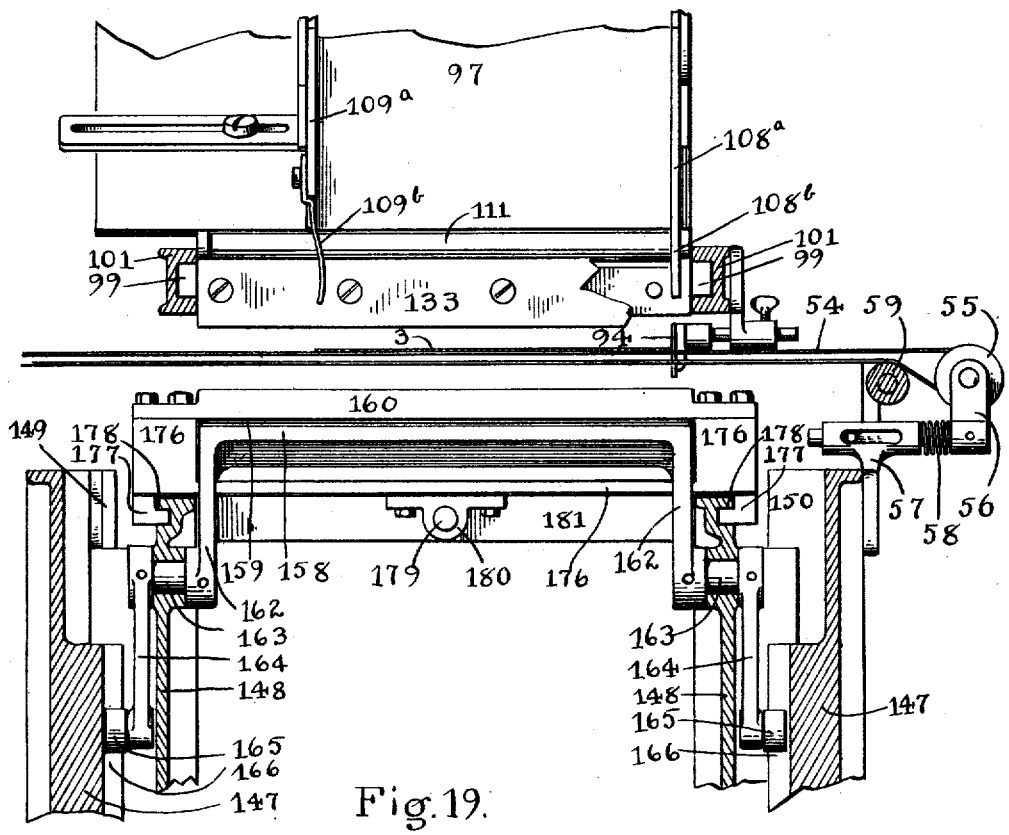
Fig. 19 is a longitudinal sectional elevation of the upper part of the machine showing details of the book feeding hopper and cover forming mechanism and other parts.
Figure 20:
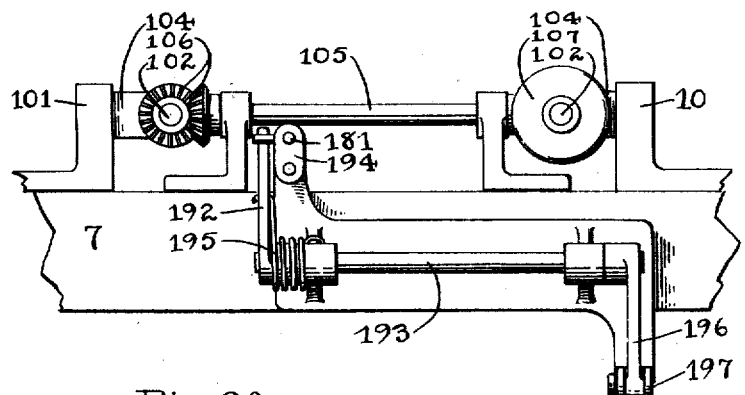
Fig. 20 is a detail elevation of the cover centering pusher and parts of the book hopper adjusting means.

The adjustable side 160 of the die is mounted upon a slide 176 carried upon the cross head, and attached thereto by tongues 177 (Fig. 19) on the slide which traverse grooves 178 in the cross head, and the slide together with the die side 160 is adjusted for books of various thicknesses by a screw 179 threaded into a lug 180 on the slide and having a bearing in the cross bar 181 on the cross head. The screw 179 also has a knob 182 by which it is turned.

The arms 146 which support the stop member 145 are pivoted between their ends to the cross members 147 of the frame and each arm is provided with a double acting spring 183. These springs are preferably located on the opposite sides of the cross members 147 from the arms in order to clear other moving parts and they tend to yieldably hold the arms 146 with the gate to operative position against the stops 184 on the cross members 147 and in inoperative position against the stops 185. The arms 146 are provided at their lower ends with cam rollers 186 which are adapted to be engaged by the cams 187 attached to the cross head as said cross head nears the top of its stroke to throw the gate into inoperative position and out of the path of the die members and also to be engaged by cams 188 on the cross head as the same nears the bottom of its stroke to throw the gate into operative position.

The cover pusher 96 is adjustable laterally of the machine on a rod 189 which is slidably supported in bearings 190 and 191. A lever 192 is fixed to a rock shaft 193 at one side of the frame and is connected to the head 194 to which the rod 189 is attached. A spring 195 engages this lever and yieldably holds the pusher 96 in retracted position. A lever 196 also attached to the rock shaft 193 extends downward and is connected to a push rod 197 which carries a cam roller 198 on its opposite end adapted to be engaged by a cam 199 on the cross head 148. The cam 199 is so located on the cross head that with its up stroke, it engages the roller 198 after the cover has been conveyed between the side stop 95 and pusher 96 and before the book is engaged with the cover, to move the pusher against the cover and properly locate it against the side stop.

The book receiving hopper is located near the lower part of the machine the rear end of it being directly beneath the cover forming dies. This hopper has a bottom 200 supported upon beams 201. It has a fixed vertical side 202 and an adjustable vertical side 203 by which its width may be adjusted to accommodate books of various lengths. The book packer 204 vertically disposed at the rear end of the hopper is mounted on slidable rods 205 having bearings in the beams 201. A fixed face plate 206 is attached to the packer and an adjustable face plate 207 is fixed to a bar 208 slidable in the packer so that the width of the same may be adjusted to approximately that of the packing box. The packer is reciprocated by a bell crank 209 pivoted to the frame, one arm of which is connected to and actuated by the cross head 148 by the connecting rod 210 and the other arm is connected to the packer by a rod 211.

The covered books are dropped from the cover forming die members into the receiving hopper in front of the packer and moved by said packer beyond retaining fingers 212. These fingers are attached to the sides of the hopper and comprise flat springs fastened at one end to the hopper and having their free ends extending normally beyond the faces of the sides to engage the books after they have been moved past them. A movable support 213 holds the books in vertical position.

The operation of the machine is as follows:—

The various adjustable members must first be adjusted to properly operate upon the cover and book of the particular size to be run through it. The gage 30 on the feed table is adjusted to locate the cover sheet laterally as it is fed. The scoring rollers 46 are adjusted by moving the brackets 48 upon the dove-tail way 49 to provide the proper space between the inner scored lines to form the back of the book. A glue transferring roller 69 having a periphery of proper width is placed upon the shaft 70. The adjustable member 82$^a$ of the cam 82 is arranged to lift the transferring roller from the cover sheet before its rear edge passes from beneath the roller. The side stop 95 and the pusher 96 are adjusted to properly center the cover sheet under the book hopper. The book hopper is moved by the adjusting screws 102 to provide the proper space between its edge and the face plate 112. The adjustable hopper side 109 is moved to accommodate the length of the books and the plates 108ª and 109ª are moved to engage the face plate. The book pushers are arranged in the proper slots 124 to engage the top edge of the book near its respective ends and are clamped by the screw 128 at the proper height on the slide 113. The pusher fingers 129 are extended from the block 130 to engage the edge of only one book at a time. The adjustable side 160 of the cover breaker is moved to accommodate the thickness of the book by moving the slide 176 by the screw 179. The movable side 203 of the book receiving hopper is adjusted for the length of the book and the movable face plate 207 of the packer is extended to approximately the width of the hopper.

After being thus adjusted the machine is ready for operation. The book hopper being first supplied with uncovered books, the operator feeds the cover sheets, with the outer face down, one at a time over the roller 28 against the stop fingers 42 when the drop rollers 129 are raised by the cam 40. As the drop rollers are lowered upon the cover it is moved forward passing over the drum 43 and scored by pressure of the scoring rollers 46. As it is conveyed forward on the tapes 54 the glue transfer roller 69 is moved out of its path and dropped to engage its upper surface over the drum 84 by action of the cam 82 and transfer glue from the periphery of the said roller to a central longitudinal strip of the cover between the scored lines thereon. The roller 69 is lifted from the cover just before its rear edge passes beneath the roller and the roller is moved to its opposite position to engage the glue supplying roller, by the cam 82.

The cover being thus scored and glued is conveyed on the tapes 54 to a point beneath the book hopper where it engages the end stop 94 which stops its longitudinal movement.

While these operations are being performed the foremost book in the hopper is moved downward by the pushers, actuated by the cam 115, so that its lower edge is between the pressure jaws 133 and 134 and the cam is so shaped that the book is allowed to dwell in this position while the jaw 134 is moved forward to compress the back of the book and uniformly crease the folds of its leaves and clench the staples therein. The jaw then moves back to release the book and the pushers continue their downward movement to extend the back of the book below the clamping jaws and engage it with the glued cover beneath.

The cross head 148 has been moving upward during the aforesaid operations and during this movement the movable side 161 of the die is released as the roller 174 leaves the cam 175 and is moved by the spring 170 to operative position and the die bottom 158, by action of the rollers 165 in the cam slots 166 is moved to horizontal operative position beneath the sides 160 and 161. As the cross head nears the top of its stroke and before the book engages the cover, the cam 199 on the cross head engages the cam roller 198 moving the cover pusher 96 to center the cover, against the side stop 95, under the book and directly following this movement the back of the book is brought against the cover which is supported by the stop member 145, and jaw 134 is again moved forward to hold the book in this position.

The next successive movement is that of the stop member 145 which is swung on its arms 146 from beneath the back of the book as the cams 187, carried by the cross head, engage the rollers 186 as the said cross head continues its up stroke.

The cover forming operation is next made by the cover breaker which engages the cover from below and folds it over the back of the book stretching it tightly by friction of the cover with the die sides and squeezing the cover against the sides of the book.

The cover is pressed firmly against the back of the book by the bottom of the cover breaker, the resilient pad 159 thereon accommodating irregularities of the said back and the side 161 of the die being yieldably held in position by the spring 170 will move sufficiently to allow for irregularities in the thickness of the book yet maintain pressure thereon.

After the cover forming operation has been performed and while the cross head is at the top of its stroke the jaw 134 is moved back to release the book but as the face plate 135 thereon extends below the upper diverging side of the jaw 161 its lower edge will swing away from the jaw as the jaw moves backward, such swinging movement being permitted by the hinged connection between the jaw and face plate.

The book being now released by the pressure jaws 133 and 134 and held firmly between the sides of the cover breaker the downward movement of the cross head will completely withdraw the book from the hopper and carry it with the cover attached, downward in vertical position and during the downward movement the bottom of said cover breaker is moved from beneath the book by the rollers 165 in the cam grooves 166 and at the bottom of the stroke of the crosshead the rollers 174 engage the fixed cams 175 and move the side 161 to release the book whereupon it drops by gravity between the sides of the cover breaker and in front of the packer 208 in the receiving hopper.

The packer 208 by its connection with the crosshead is moved back to receive a book in front of it at the lower position of the crosshead again rises the packer is moved forward carrying the book past the retaining stops 212 and as the books accumulate in the receiving hopper they are further squeezed by resistance of the support 213 and the glue allowed to dry sufficiently so that they are completely and permanently covered when removed from the said hopper.

I claim:—

1. In a book covering machine, the combination of a holder for containing a plurality of uncovered books bound together at their backs, the books being located in the holder with the backs down, means to force the foremost book from the holder by successive steps, pressure jaws between which the books pass, one of said jaws being movable with respect to the other, means to successively move said movable jaw toward the other jaw between successive movements of the book from the holder, mechanism for carrying a cover to a point underneath the jaws and a cover breaker into which the back of the book and the cover may be forced to conform the cover to the back of the book.

2. In a book covering machine the combination of a pressure device including a relatively fixed and a movable jaw, means to feed a book between the jaws by successive stages, means to successively force the movable jaw against the book between the stages of its movement through the jaws, mechanism for carrying a cover to a point below the jaws, and a cover breaker for receiving the lower edge of the book and the cover applied thereto and into which said lower edge of the book and adjacent portion of the cover are forced by the feeding means after contact of the book with the cover, substantially as described.

3. In a book covering machine, the combination of a pressure device including a relatively fixed and a movable jaw, a holder for books above the jaws, means to feed the books one at a time between the jaws by successive stages to deliver the same partially from the holder, means to successively force the movable jaw against the book between the stages of its movement through the jaws, mechanism for carrying a cover to a point below the jaws directly below the book fed downwardly through the pressure jaws, a cover breaker for receiving the lower edge of the book and the cover applied thereto and means to move the cover breaker into position to receive the cover and book and afterward draw the book entirely from the holder.

4. In a book covering machine, a holder for uncovered books adapted to carry a plurality of books with the backs down, means to partially eject a book from the holder in successive steps, mechanism for carrying book covers below the holder, a cover breaker into which the back of the book and the cover may be forced with the last step of the operation of said book ejecting means and means for lowering the cover breaker to completely withdraw the book from the holder.

5. In a book covering machine, the combination of a holder for uncovered books adapted to carry a plurality of said books with the backs down, means for ejecting the foremost book in the holder from the holder by successive steps to bring the back of the book in contact engagement with a cover, means for feeding a cover to a point below the book holder, means for applying adhesive to the upper side of the cover lengthwise thereof so that the back of the book will contact therewith when partially ejected, means for adjusting the cover to proper position, pressure jaws and means for successively operating the same against the sides of the book between successive steps of the ejectment of the book, a cover breaker located directly below the point of ejectment of the book from the holder, means for moving the cover breaker vertically, said cover breaker receiving the back of the book and the cover as the last step on the movement of the ejecting means is completed, the book being completely withdrawn from the holder on the downward movement of the die.

6. In a book covering machine, a combination of a holder for books adapted to hold a plurality of uncovered books with their backs down, ejecting means for engagement with the upper edges of the foremost book in the holder, means to operate said ejecting means to force said book downwardly partially from the holder, mechanism for carrying a cover to a point below the holder, means for applying a strip of adhesive to the cover, the back of the book contacting with said adhesive at the termination of one of the intermediate steps of operation of the ejecting means, and a cover breaker for receiving the back of the book and cover, said book and cover being forced into the cover breaker at the termination of the last step of operation of the ejecting means.

7. In a book covering machine, the combination of a holder for books adapted to hold a plurality of uncovered books with the backs down, said holder having an opening at the front end and in the bottom thereof, means to engage with the upper edge of the front book in the holder and partially eject it downwardly therefrom, a cover breaker located below said opening, means for moving the cover breaker back and forth in a vertical direction, means for carrying a cover to a point between the book holder and cover breaker whereby on partial ejectment of the book from the holder said book and cover are forced into the cover breaker, means for applying adhesive to the cover previous to forcing it into the cover breaker, said die on its downward movement withdrawing the book from the holder and means for releasing the book from the cover breaker upon completion of the downward movement of said cover breaker.

8. In a book covering machine, a holder having an opening in its lower front end and adapted to contain a plurality of uncovered books positioned with their backs down, means for successively ejecting the foremost book from the holder, means for applying a cover thereto, said means including a cover breaker into which the back of the book and adjacent portion of the cover are forced, means for moving the cover breaker upwardly to a position to receive the book and cover, and then downwardly to carry the back and cover away from the holder, and means for releasing the book from the cover breaker, substantially as described.

9. In a book covering machine, a holder having an opening in its lower front end and adapted to contain a plurality of uncovered books positioned with their backs down, means for successively ejecting the foremost book from the holder, means for applying a cover thereto, said means including a cover breaker into which the back of the book and adjacent portion of the cover are forced, and means for moving the cover breaker upwardly to position to receive the book and cover, and then downwardly to carry the back and cover away from the holder.

10. In a book covering machine, the combination with a support, of a cross head slidably mounted on the support for vertical movements, means for reciprocating the cross head, a cover breaker including a relatively stationary side mounted on the cross head, an arm pivotally mounted on the cross head, a second side carried at the upper end of the arm and spaced from the first side, a spring connected to the lower end of the arm tending to force said side toward the relatively stationary side, a pin to stop the movement of the arm, a second arm pivotally mounted on the cross head, a base member for the cover breaker carried at the upper end on said second arm, means for operating said second mentioned arm to come beneath the sides of the cover breaker on upward movement of the cross head and to move away from said sides on downward movement thereof, and means for moving said second side away from the first side on the downward movement of the cross head, substantially as described.

11. In a book covering machine, a combination of a supporting frame and holder for uncovered books comprising a relatively stationary front side and a book supporting member adjustable toward and away from said side, an ejecting member slidably mounted on the stationary front side of the book holder, a link depending therefrom, a shaft, a cam on the shaft, a lever pivotally mounted between its ends, the rear end of said lever being pivotally connected with the end of the link, a post pivotally connected to and depending from the link in front of its pivotal mount, a roller on the post bearing against the cam, a spring under tension secured between the front end of the lever and to the frame, and fingers on the ejecting member projecting through the front side of the holder and adapted to engage with the upper edge of the foremost book in the holder.

12. In a book covering machine, a holder for books adapted to receive a plurality of uncovered books positioned with their backs down, said holder being provided with an opening through which books may be ejected one at a time, a relatively stationary jaw located at one side of the opening, a second jaw located at the opposite side of the opening, a bar to the end of which the second jaw is secured, means for slidably mounting the bar, a spring tending to carry the bar and attached jaw away from the relatively stationary jaw, a shaft, a cam on the shaft, an ejecting member slidably mounted at the front of the holder, fingers on said ejecting member adapted to extend over the upper end of the foremost book in the holder, a link depending from the ejecting member, a lever located in front of the holder and having pivotal connection at its rear end to the lower end of the link, a bar pivotally connecting to and depending from the lever between the ends thereof, said bar lying directly in front of the first mentioned slidably mounted bar, a roller at the lower end of the second bar bearing against the cam, a second cam on the shaft, a post pivotally connected to the lever in front of said second bar and extending downwardly from the lever, a roller at the lower end of the post bearing against the second cam, and a spring under tension connected to the front end of the lever, said cams being so designed and related to each other that rearward movement of the second bar and consequent operation of the sliding bar occurs between successive downward movements of the ejecting means, substantially as described.

13. In a machine of the class described, a supporting frame, book covering mechanism located at the rear of the frame, a horizontal table secured at the front of the frame, a roller mounted at the rear edge of the table between the sides of the frame, gearing for driving said roller, arms pivotally connected at opposite sides of the frame, a second roller carried by said arms directly above the first roller, a stop carried between the free ends of said arms normally located in the rearward path of movement of a book cover laid upon the table and first roller, means for periodically lowering said arms and attached roller and stop to permit movement of said cover to the rear through the rollers, cover carrying means back of the first pair of rollers to which the cover is delivered, means for applying adhesive to the cover at the central portion thereof as it is carried to the rear by said transfer means, and means for attaching said cover to an uncovered book, substantially as described.

14. In a book covering machine, the combination of a cover transporting apparatus, mechanism for applying a liquid adhesive to the central portion of the upper side of the cover as it is transported, means for stopping the cover, means for scoring the cover its full width at a plurality of points before the application of the adhesive thereto, means for forcing the back of an uncovered book against the cover, means for supporting the cover during said operation, means for moving said support away from the cover after engagement of the back of the book against the cover, a vertically reciprocating cover breaker, means for moving the same upwardly to a point underneath the book and cover, said means for forcing the back of the book against the cover operating to force the back of the book and adjacent portions of the cover into the cover breaker to conform the cover to the book, substantially as described.

15. In a book covering machine, a holder to receive a plurality of uncovered books vertically disposed, means to eject the foremost book from the holder comprising a vertically reciprocable slide, fingers pivotally connected to said slide and projecting therefrom to engage the top edge of said foremost book and push said foremost book down as said slide is moved down, and retract when engaged by the next successive book in the holder as the slide is moved upward, means for successively reciprocating the slide to move each book in succession downwardly in successive stages, means for locating the cover relative to the book and means for forming the cover about the back of the book.

16. In a book covering machine, a holder to receive a plurality of vertically disposed books and having an outlet opening in its bottom, a fixed guide to be engaged by one end of a book as it is moved through said opening, means for pushing the book against said guide, means to eject the books one at a time through said openings, means for locating the cover relative to the book and means for forming the cover over the back of the book.

17. In a book covering machine, a holder, to receive a plurality of books, vertically disposed with their backs down and having an outlet opening in its bottom, means to eject the books one at a time through said outlet, a fixed guide to be engaged by one end of the book as it is ejected, a flat spring opposite the said guide and normally extending into the path of one end of the book to engage it and force its opposite end against said fixed guide as it is ejected, means for locating the cover relative to the book and means for forming the cover over the back of the book.

18. In a book covering machine, means for locating an uncovered book in the machine, means for locating a cover relative to the book including a reciprocable pusher, a reciprocable crosshead, means for reciprocating the same, a cover breaker to form the cover over the back of the book, said cover breaker having a movable bottom and a movable side, a receiving hopper for the covered books having a reciprocable packer therein, and mechanism associated with said pusher, cover breaker and packer for enabling the same to be actuated by the cross head on the reciprocation thereof.

In testimony whereof I affix my signature.

THEODORE S. ETHERIDGE.

Copies of this patent may be obtained for five cents each, by addressing the "Commissioner of Patents, Washington, D. C."